M. A. ROSS.
BICYCLE OR MOTOR CYCLE SADDLE.
APPLICATION FILED JAN. 21, 1913.
1,068,703.
Patented July 29, 1913.
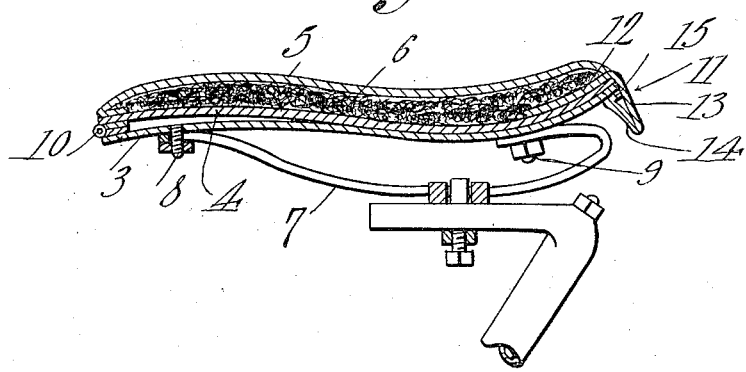
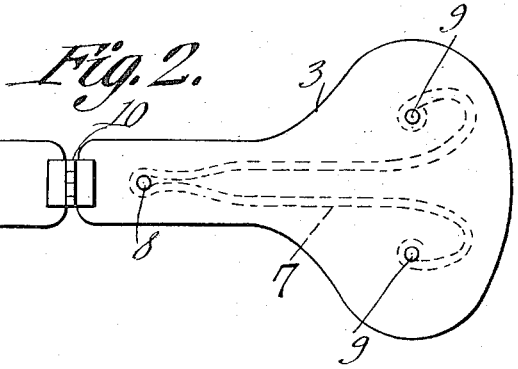
Witnesses
M. A. Ross,
Inventor
by
Attorneys

UNITED STATES PATENT OFFICE.

MILTON A. ROSS, OF PENDLETON, OREGON.

BICYCLE OR MOTOR-CYCLE SADDLE.

1,068,703. Specification of Letters Patent. Patented July 29, 1913.

Application filed January 21, 1913. Serial No. 743,411.

*To all whom it may concern:*

Be it known that I, MILTON A. Ross, a citizen of the United States, residing at Pendleton, in the county of Umatilla and State of Oregon, have invented a new and useful Bicycle or Motor-Cycle Saddle, of which the following is a specification.

The present invention appertains to seats or saddles for bicycles, motorcycles, et cetera.

It is the object of the present invention to provide a saddle of the character indicated, the pad or facing of which is adapted to be inverted, when the saddle is not in use, in order that the facing or pad will not become wet, moistened, or otherwise affected by rain, snow, sleet and the like.

It is also the object of the present invention to provide a saddle of the character specified which can be converted into a shield or covering for the pad or facing during rainy or stormy weather when the bicycle or motorcycle is not in use, so that the facing or pad will not become wet, soiled or the like, and without the employment of a hood, shield or other covering for the saddle, or without the necessity of wiping or drying the saddle.

The present invention also aims to provide a saddle of the character indicated which shall be of simple, durable, compact, substantial and inexpensive construction, which shall be efficient, convenient and serviceable in its use, and which shall not deviate materially or radically from standard constructions.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The invention has been illustrated in its preferred embodiment in the accompanying drawings, wherein:—

Figure 1 is a central longitudinal section of the saddle as in closed position, or in position for use. Fig. 2 is a plan view of the saddle as open, when not in use, to protect the pad or facing from exposure to rain, snow and the like.

Referring specifically to the drawings, the saddle embodies two superimposed congruent plates 3 and 4, which are of usual or pear shaped contour corresponding with saddles of this character so as to have their forward ends reduced or contracted. The upper plate 4 is adapted to normally rest snugly on the lower plate 3, and bears the pad. The pad embodies the leather or other flexible facing 5 which is similar in contour with and peripherally secured to the upper plate 4, packing 6 of any suitable character being disposed between the facing 5 and the upper plate 4. The spring support 7 is secured to the bottom of the lower plate 3, the same being constructed of a resilient rod having its forward or doubled portion engaging a bolt 8 secured to the forward portion of the lower plate 3, and having its ends or terminals engaging a pair of bolts 9 secured to the rear portion of the lower plate 3. This spring support 7 is adapted to be clamped in the usual manner to the seat or saddle post so as to support the lower plate 3, which in turn supports the upper or superimposed plate 4.

The forward or small ends of the plates 3 and 4 have been hinged together by the hinge 10, the leaves of which are secured to the adjoining faces of the respective plates. This hinge permits the plates to be swung apart, as seen in Fig. 2, so that the upper plate is inverted, thus shielding or protecting the facing 5 or the pad.

The latch 11 is carried by the free portion or rear end of the upper plate 4, the same being fashioned from a leaf or resilient strip of metal, one end 12 of which is secured, such as by soldering or the like, on the rear end of the upper plate 4. This leaf spring or strip is then bent downwardly, as at 13, and is bent back as designated by the numeral 14, the free end being bent angularly to provide a catch or stop 15. Thus, the resilient latch carried by the rear end of the upper part or plate 4 is adapted to snap or engage over the end of the lower plate, the portion 14 serving as a cam to spring the latch outwardly, so that the stop 15 may snap or engage under the rear end of the lower plate. The portions 13 and 14 of the latch also provide a suitable finger hold in order that the latch may be sprung out of engagement with the lower plate for permitting the upper plate to be swung open or forwardly. It is to be noted that the end 12 of the latch which is secured upon the upper plate 4, is disposed below the facing 5 so as not to present any unnecessary protuberance.

In use, the saddle will ordinarily serve its usual function, in an efficient manner, and will not be cumbersome or objectionable. When the saddle is not in use, should it be desired to protect the facing or pad from exposure to rain, snow or the like, the latch may be readily disengaged from the lower plate so as to permit the upper plate to be swung forwardly to a position above or against the frame of the bicycle or motorcycle. Thus, the pad or facing will be protected from the rain, snow or the like, and will not be affected thereby, so that when the saddle is again swung in position for use, the pad or facing will be dry and uninjured. It is therefore not necessary to employ a hood, shield or other covering for the seat during a rain or snow storm nor is it necessary to wipe or dry the seat at any time, for the reason that the same will not become wet or dampened if proper precautions are used.

What is claimed is:—

A bicycle saddle embodying superimposed pear shaped plates having their small ends hinged together, a facing similar in contour with and secured peripherally to the upper plate, packing disposed between the facing and the upper plate, a leaf spring having one end secured on the large end of the upper plate under the facing and having its other end bent downward into a catch to snap into engagement under the large end of the lower plate, and a spring support secured to the lower plate for attachment to a saddle post.

In testimony that I claim the foregoing as my own, I have hereto affixed my signature in the presence of two witnesses.

MILTON A. ROSS.

Witnesses:
PETER C. PETERSON,
EDGAR C. JAY.

---

Copies of this patent may be obtained for five cents each, by addressing the "Commissioner of Patents, Washington, D. C."